J. E. WHITAKER.
COUNTER.
APPLICATION FILED FEB. 24, 1920.
1,385,292. Patented July 19, 1921.
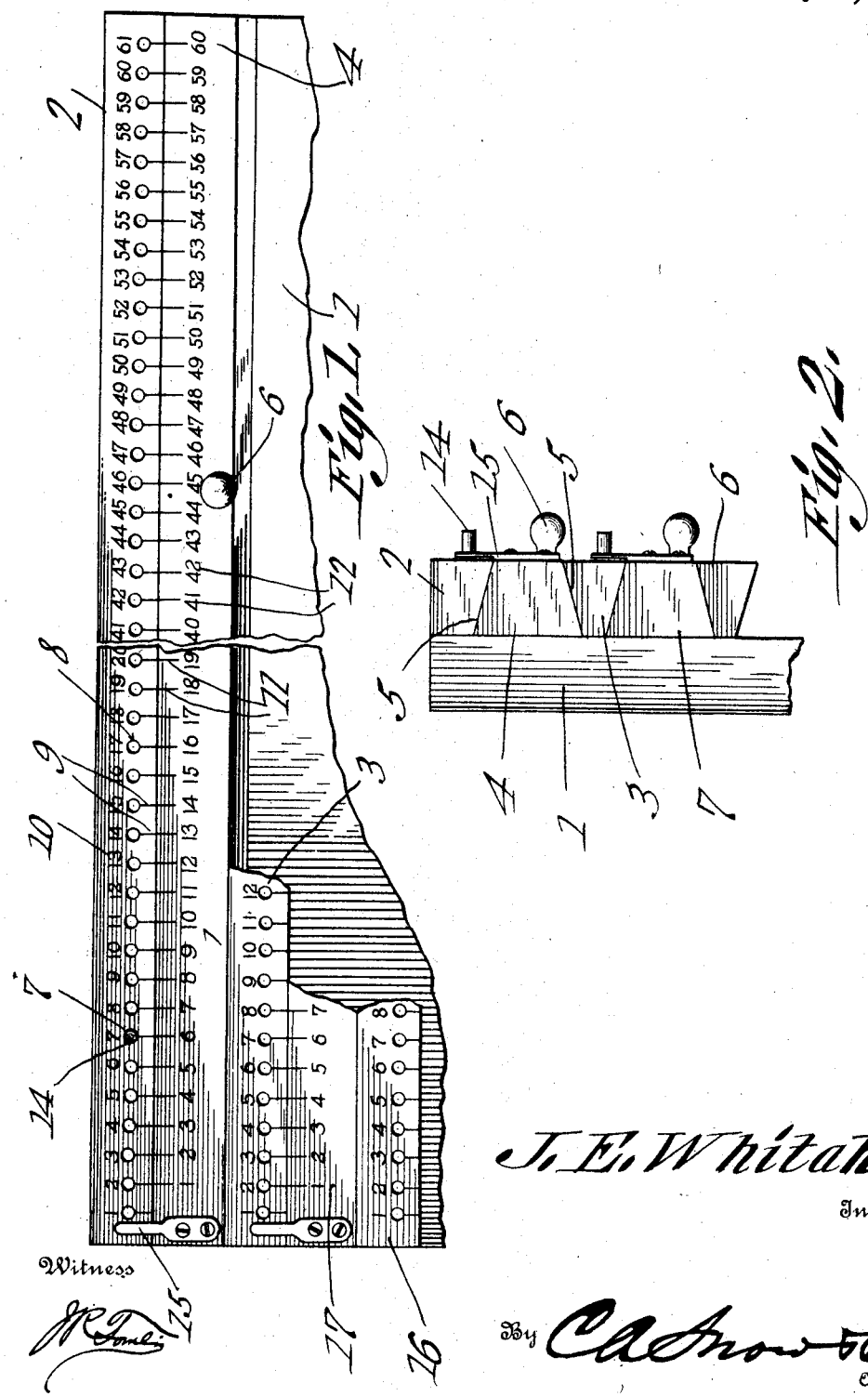

UNITED STATES PATENT OFFICE.

JOHN EDWARD WHITAKER, OF MONROE, LOUISIANA.

COUNTER.

1,385,292.    Specification of Letters Patent.    Patented July 19, 1921.

Application filed February 24, 1920. Serial No. 360,847.

*To all whom it may concern:*

Be it known that I, JOHN EDWARD WHITAKER, a citizen of the United States, residing at Monroe, in the parish of Ouachita and State of Louisiana, have invented a new and useful Counter, of which the following is a specification.

It is the object of this invention to provide a simple but efficient means whereby a score can be kept by adding up numerals through the instrumentality of a slide, the device being adapted primarily but not exclusively to be used for keeping pool scores.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in front elevation, a device constructed in accordance with the invention, parts being broken away; and Fig. 2 is an end elevation of the structure shown in Fig. 1.

The numeral 1 denotes a support which may be in the form of a plate or board. A guide 2 is secured to the support 1, a guide 3 being secured to the support in parallel relation to the guide 2. A slide 4 is mounted for right-line reciprocation on the support 1 between the guides 2 and 3, the guides 2 and 3 being undercut as shown at 5, and the slide 4 being correspondingly beveled, so that the guides hold the slide in place. The slide 4 is supplied with a projection 6 whereby the slide may be manipulated.

The guide 2 is provided with a scale including a plurality of holes and transverse marks 9 extending inwardly from the holes, there being numerals 10 on the guide 2 adjacent to the holes. For convenience in describing the operation of the structure, certain of the holes have been designated by the numerals 7 and 8. The numerals 10 preferably read consecutively from 1 to 61, although 61 may or may not be the final numeral on the scale. The slide 4 is provided with a scale including numerals 12 and transverse marks 11, the numerals reading, if desired, consecutively, from 1 to 60. It is to be observed that the unit graduation of the scale on the slide 4 is disposed opposite to the second graduation of the scale on the guide 2 when the end of the slide 4 is alined with the end of the guide 2.

The slide 4 carries a transverse finger 15 adapted to coöperate with the scale on the guide 2. A stop, preferably in the form of a pin, denoted by the numeral 14, may be inserted into any of the holes in the guide 2. The stop pin is a useful but not mandatory element of the invention.

Let it be supposed that, in a pool game, the first run amounts to seven points. Then, the stop pin 14 is inserted into the hole 7. The slide 4 is advanced until the finger 15 abuts against the stop pin 7. Let it be supposed that the second run amounts to ten points. Then the operator notes the tenth graduation on the scale of the slide 4 and observes that this graduation is in alinement with the seventeenth graduation of the scale on the guide 2. The pin 7 is then inserted into the hole 8 and the slide 4 is advanced until the finger 15 abuts against the pin in its new position. The operation above described may be continued, the various runs being added up.

There may be as many slides as occasion may require. Thus, a guide 16 may coöperate with the guide 3, a slide 17 being mounted for reciprocation between the members 3 and 16, the showing of one additional slide making it evident that as many slides may be used as is found expedient or necessary.

Having thus described the invention, what is claimed is:—

A tally device for keeping pool scores and the like, comprising guides, and a slide mounted for right line reciprocation between the guides, the slide having a scale, and one guide having a scale coöperating with the scale of the slide, the first graduation of the scale on the slide coinciding with the second graduation of the scale on the guide when the end of the slide is flush with the corresponding ends of the guides, there being holes in said guide individual to the graduations of the scale of the guide; a finger on the slide and overlapping the guide having the scale, the finger being disposed in tangential relation to the outer edge of the first of the holes when the first graduation of the scale on the slide coincides with the second graduation of the scale on the guide; and a pin forming a stop coacting with the finger, the pin being insertible into any of the holes.

In testimony that I claim the foregoing as my own, I have hereto affixed my signature in the presence of two witnesses.

JOHN EDWARD WHITAKER.

Witnesses:
W. E. HOWELL,
C. P. MELTON.